US012006838B2

(12) United States Patent
Cavadini

(10) Patent No.: US 12,006,838 B2
(45) Date of Patent: Jun. 11, 2024

(54) TURBINE BLADE FOR A STATIONARY GAS TURBINE

(71) Applicant: Siemens Energy Global GmbH & Co. KG, Bayern (DE)

(72) Inventor: Philipp Cavadini, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 36 days.

(21) Appl. No.: 17/780,670

(22) PCT Filed: Dec. 4, 2020

(86) PCT No.: PCT/EP2020/084603
§ 371 (c)(1),
(2) Date: May 27, 2022

(87) PCT Pub. No.: WO2021/110899
PCT Pub. Date: Jun. 10, 2021

(65) Prior Publication Data
US 2023/0358142 A1 Nov. 9, 2023

(30) Foreign Application Priority Data
Dec. 6, 2019 (EP) .................................... 19214178

(51) Int. Cl.
*F01D 5/18* (2006.01)
*F01D 5/20* (2006.01)

(52) U.S. Cl.
CPC ............... *F01D 5/189* (2013.01); *F01D 5/20* (2013.01); *F05D 2260/201* (2013.01); *F05D 2260/204* (2013.01)

(58) Field of Classification Search
CPC . F01D 5/187; F01D 5/189; F01D 5/20; F05D 2260/201; F05D 2260/204
See application file for complete search history.

(56) References Cited

U.S. PATENT DOCUMENTS 5,997,251 A * 12/1999 Lee ......................... F01D 5/187 416/97 R
6,220,817 B1 * 4/2001 Durgin .................... F01D 5/187 415/115

(Continued)

FOREIGN PATENT DOCUMENTS

CA 2560811 A1 3/2007
CN 103527261 A 1/2014

(Continued)

OTHER PUBLICATIONS

Yang Zilong et al; "Study of the Heat Exchange Characteristics of the Cooling Passages of a Turbine Blade"; Journal of Engineering for Thermal Energy & Power; Jul. 2013; vol. 28, No. 04; China; English abstract attached.

(Continued)

*Primary Examiner* — David E Sosnowski
*Assistant Examiner* — Jason G Davis
(74) *Attorney, Agent, or Firm* — Wolter Van Dyke Davis, PLLC

(57) ABSTRACT

A turbine blade having a blade airfoil. A first cooling path for a first coolant stream and a second cooling path for a second coolant stream are formed within the blade airfoil. The first cooling path includes a first coolant passage, which is designed for cyclone cooling of the leading edge, and a second coolant passage, which adjoins the first coolant passage and extends below the blade tip from the leading edge toward the trailing edge. The second cooling path includes a serpentine coolant passage for cooling a central region of the blade airfoil and a first trailing-edge coolant passage for partially cooling a trailing-edge region.

22 Claims, 7 Drawing Sheets

(56) References Cited

U.S. PATENT DOCUMENTS

| | | | | |
|---|---|---|---|---|
| 7,845,908 | B1 | 12/2010 | Liang | |
| 7,988,419 | B1 | 8/2011 | Liang | |
| 8,628,298 | B1 | 1/2014 | Liang | |
| 9,745,853 | B2 * | 8/2017 | Lee | F01D 5/187 |
| 9,810,073 | B2 * | 11/2017 | Jung | F01D 5/187 |
| 10,174,622 | B2 * | 1/2019 | Zhang | F01D 5/187 |
| 2002/0051706 | A1 | 5/2002 | Haehnle | |
| 2005/0084370 | A1 | 4/2005 | Gross | |
| 2010/0239431 | A1 | 9/2010 | Liang | |
| 2013/0216395 | A1 | 8/2013 | Bregman | |
| 2013/0224019 | A1 * | 8/2013 | Kim | F01D 5/187<br>416/97 R |
| 2014/0037460 | A1 | 2/2014 | Saxer-Felici | |
| 2014/0086756 | A1 | 3/2014 | Papple | |
| 2014/0169962 | A1 | 6/2014 | Lee | |
| 2016/0208622 | A1 | 7/2016 | Ahmad | |
| 2017/0275998 | A1 | 9/2017 | Lee | |
| 2017/0292386 | A1 | 10/2017 | Zhang | |
| 2018/0238176 | A1 | 8/2018 | Landrum | |
| 2018/0298763 | A1 | 10/2018 | Lee | |
| 2019/0093487 | A1 | 3/2019 | Marsh | |

FOREIGN PATENT DOCUMENTS

| | | | |
|---|---|---|---|
| CN | 104854311 | A | 8/2015 |
| CN | 105593471 | A | 5/2016 |
| CN | 106715834 | A | 5/2017 |
| CN | 107109949 | A | 8/2017 |
| CN | 108026775 | A | 5/2018 |
| EP | 1783327 | A2 | 5/2007 |
| WO | 9615358 | A1 | 5/1996 |
| WO | 2016043742 | A1 | 3/2016 |
| WO | 2016076834 | A1 | 5/2016 |
| WO | 2017039571 | A1 | 3/2017 |

OTHER PUBLICATIONS

Je-Chin Han et al; "Gas Turbine Heat Transfer and Cooling Technology"; pp. 293-296; Jul. 2005; Jiaotong University Press; English machine translation attached.

Qin, Jiang et al; "Analysis of Rotating Cooling Effects with Oil for Turbine Blade"; Journal of Propulsion Technology; Jan. 2017; vol. 38, No. 2; China; English abstract attached.

PCT International Search Report and Written Opinion of International Searching Authority dated Dec. 3, 2021 corresponding to PCT International Application No. PCT/EP2020/084603 filed Apr. 12, 2020.

* cited by examiner

TURBINE BLADE FOR A STATIONARY GAS TURBINE

CROSS REFERENCE TO RELATED APPLICATIONS

This application is the US National Stage of International Application No. PCT/EP2020/084603 filed 4 Dec. 2020, and claims the benefit thereof. The International Application claims the benefit of European Application No. EP19214178 filed 6 Dec. 2019. All of the applications are incorporated by reference herein in their entirety.

FIELD OF INVENTION

The invention relates to a turbine blade.

BACKGROUND OF INVENTION

Turbine blades of gas turbines are subjected to extremely high thermal and mechanical loads during operation, and for this reason these are nowadays designed to be coolable with the aid of complex hollow inner geometries and to be particularly robust.

In this regard, for example, WO 1996/15358 A1 has disclosed a gas-turbine blade which corresponds to the preamble of the independent claim and in which, with the aid of cooling air introduced tangentially into a leading-edge cooling channel, cooling of the leading edge is made possible without the need therein for further film-cooling holes (also commonly referred to as showerhead holes) for the cooling thereof. A significant proportion of the cooling air flowing in the leading-edge cooling channel is however released from the turbine blade via film-cooling holes arranged in the suction side close to the leading edge (also referred to as gill holes), while the remaining proportion of this cooling air is guided below the blade tip to the leading edge. The rest of the blade airfoil, by contrast, is cooled via a serpentine cooling channel with an adjoining trailing-edge blowing-out arrangement.

Furthermore, WO 2017/039571 A1 has disclosed a so-called multi-wall turbine blade. Provided in its interior are two displacement bodies, by way of which the cooling air flowing in the interior of the turbine blade is intended to be pushed particularly close to the inner surfaces of the outer walls. An alternative configuration of a multi-wall turbine blade is moreover presented in EP 1 783 327 A2. Furthermore, US 2010/0239431 A1 presents a turbine blade having—in relation to the span width—two adjacent meandering cooling channels which are connected in series via a channel which cools the leading edge.

In striving for further increased efficiencies of turbines, there is a constant demand for saving of cooling air, since the saved cooling air can be used in an efficiency-increasing manner as primary air for oxidation of fossil fuels or synthetic fuels.

SUMMARY OF INVENTION

The object of the invention is consequently to provide a durable turbine blade with further reduced coolant consumption.

Said object is achieved according to the invention by a turbine blade as claimed. The present invention proposes a turbine blade for a stationary gas turbine which is flowed through in particular axially, in particular for one of the high-pressure turbine stages thereof, having a cooling system which is arranged in the interior of said turbine blade and which comprises a first cooling path for a first coolant stream and a second cooling path, substantially, preferably completely, separated from the first cooling path, for a second coolant stream, in which the first cooling path comprises a first coolant passage, which is configured for cyclone cooling of the leading edge, and a second coolant passage, which adjoins the first coolant passage and extends below the blade tip from the leading edge in the direction of the trailing edge, wherein the second cooling path comprises a serpentine coolant passage for cooling of a middle region of the blade airfoil, which middle region is arranged behind the leading-edge region in the chordwise direction, and a first trailing-edge coolant passage for at least partial cooling of a trailing-edge region of the blade airfoil, which trailing-edge region is arranged behind the middle region in the chordwise direction and extends as far as the trailing edge, wherein the first trailing-edge coolant passage is connected in terms of flow to a multiplicity of first exit holes arranged in the trailing edge, wherein the first coolant passage is configured for exit-hole-free, that is to say locally closed, cooling and the first cooling path further comprises: a third coolant passage, which adjoins the second coolant passage and extends mainly radially inwardly, and a second trailing-edge coolant passage, which adjoins the third coolant passage and is configured for cooling of a blade-tip-side region of the trailing-edge region and is connected in terms of flow to a multiplicity of second exit holes arranged in the trailing edge.

The invention is based on the realization that a significant saving of coolant for cooling the turbine blade can be achieved only if the leading edge and/or the pressure-side side wall and/or the suction-side side wall of the blade airfoil has no openings through which coolant can flow out and, there, can flow into a hot gas which flows around the turbine blade. In order to make possible a simple construction of the turbine blade, the coolant escapes at least at the trailing edge and possibly also through the outwardly pointing blade tip. Thus, merely those passages and channels by way of which the leading edge and a major part of the pressure and suction sides of the blade airfoil can be cooled are to be configured for locally closed cooling. In other words: neither showerhead holes, nor gill holes, nor other film-cooling holes branch off from the first coolant passage and/or from the serpentine coolant passage; these are free of exit holes. Exit holes are provided only at the trailing edge and possibly in the blade tip. Locally closed cooling is not to be understood as meaning that no coolant at all may exit from the blade airfoil into the hot gas.

In order to nevertheless achieve sufficient cooling of the leading edge, in particular of thermally extremely highly loaded turbine blades, there is in fact an increased need for coolant in case of locally closed, that is to say exit-hole-free, leading-edge cooling. With the invention, it is now however proposed for the first time for the first coolant stream, used for the leading-edge cooling, to be used for cooling of a radially outer part of the trailing-edge region of the blade airfoil too. Instead of the coolant being released, as in the prior art, directly via gill holes and at the trailing edge, according to the invention, there is introduced into the system a rear separating rib, which diverts the coolant coming from the forward-flowing system inwardly again and finally guides it to a further trailing-edge coolant passage. Consequently, the first coolant stream is guided via a second coolant passage, which extends directly below the blade tip to the rear end of the blade airfoil, and via an adjoining third coolant passage to preferably approximately half the height of the trailing edge, in order to then be used usefully in a radially outwardly arranged trailing-edge coolant passage. Owing to this solution, the need for cooling air for the second flow path can be reduced significantly. Thus, the approach proposed herein offers maximum utilization of the available coolant owing to a novel division and with the use of a cooling concept, specifically cyclone cooling, which, for turbine blades of the first and/or second stage of gas turbines with relatively high compression pressure ratios or high turbine-entry temperatures, has hitherto been regarded as completely unsuitable and therefore not been considered for the turbine blades thereof.

Cyclone cooling is to be understood as meaning cooling in the case of which significant proportions of coolant flowing in a cooling channel or in a coolant passage flow in a swirled manner from a main inlet for the coolant to a main outlet. Swirled means that the significant proportion of the coolant flows along the respective channel or passage in the manner of a spiral line or helix. The swirled flow is to be distinguished from a turbulent flow. The latter is generally brought about by so-called turbulators, and accordingly occurs in areas with very limited space since only a very small proportion of the coolant is reached and manipulated by the turbulators. When the respective area has been departed from, the turbulence will also have died out again. Consequently, a swirled main flow may also have turbulent secondary flow components in locally very small areas, but the converse does not hold true.

With the invention, the consumption of coolant can be reduced to an extent not anticipatable in advance, with simultaneous sufficient cooling of the entire blade airfoil. According to detailed simulations, this holds true even for turbine blades in one of the two front turbine stages of a stationary gas turbine, whose turbine-entry temperature, during operation under ISO conditions, is 1300° C. and higher or whose compression pressure ratio is 19:1 or higher. Even in the case of such turbine blades, the amount of coolant was able to be lowered by approximately 30% in comparison with a conventional one, having cooling holes arranged in the leading edge, while achieving the same service life.

According to a further embodiment of the invention, one or more exit holes for coolant are arranged in the blade tip and are connected in terms of flow to the second coolant passage. This measure improves the fatigue strength of any rubbing edges projecting from the blade tip.

In a further embodiment, the first cooling path comprises a supply passage for the first coolant passage, which, in a manner arranged directly adjacent to the first coolant passage and extending at least over a major part of the span width of the blade airfoil, is connected in terms of flow to the first coolant passage via a multiplicity of passage openings, wherein the passage openings have means for imparting swirl to or for intensifying the swirl of the coolant flowing in the first coolant passage. The passage openings have as means a specific orientation. If, for example, the passage openings open out tangentially, that is to say eccentrically in the first coolant passage and in particular in a manner aligned with the inner surface of the suction-side or pressure-side side wall, and/or are inclined with respect to a radial direction, the swirl required for the cyclone cooling can, using simple means, be imparted to or intensified for the coolant flowing in the first coolant passage. Consequently, efficient cyclone cooling of the leading edge can be provided relatively easily.

Cyclone cooling of the leading edge that is adapted or homogenized over the height of the blade airfoil can be achieved according to a further embodiment in that a density, ascertainable in the spanwise direction, of passage openings is greatest at the root-side end, and preferably decreases in a stepped manner or continuously toward the blade tip. This allows the flow speed in the first coolant passage to be kept almost constant over the span width of the blade airfoil, which can likewise be achieved by a first coolant passage narrowing in cross section toward the blade tip.

According to a further advantageous configuration, a multiplicity of preferably rib-like, in particular inclined, turbulators is arranged on one of more inner surfaces of one of more coolant passages in order, locally, to further increase the transfer of heat into the first and/or second coolant and/or to promote the swirl.

According to a further refinement of the invention, a multiplicity of pedestals arranged in a pattern, that is to say in multiple rows, is provided in each trailing-edge coolant passage. This allows a suction-side and pressure-side trailing-edge region of the blade airfoil, which adjoins the middle region of the blade airfoil and extends as far as the trailing edge of the blade airfoil, to be cooled in an exit-hole-free, that is to say locally closed, manner easily and efficiently. Furthermore, in this way, it is also possible for the division of the coolant for the two cooling paths and for the pressure losses occurring therein to be set efficiently.

In a further embodiment, provision is made of two cooling-channel arms, which widen the second coolant passage and, with increasing extent in the chordwise direction, expand radially inward and open out in the third coolant passage. This measure reduces or compensates for the reduction in the throughflow cross section of the second coolant passage, which results owing to the drop-shaped form of the blade profile, which narrows to a point toward the trailing edge. Consequently, it is possible to achieve an approximately constant cross-sectional area for the entire length of the second coolant passage, whereby the first coolant stream can flow through the second coolant passage at constant speed. Flow separation can thus be avoided while maintaining uniform cooling of the blade tip and the local regions of the side walls.

Furthermore, according to a refinement of the aforementioned embodiment, a separating wall is arranged between the second coolant passage and the serpentine coolant passage and connects the two side walls to one another and extends in the chordwise direction, wherein, with progressively closer proximity to the trailing edge, the separating wall forms a displacement wedge which narrows preferably to a point and which, in conjunction with the inner surfaces of the two side walls, laterally delimits the two cooling-channel arms.

According to a further embodiment of the invention, a rear separating rib is provided between the third coolant passage and the second trailing-edge coolant passage and extends in the spanwise direction. Possibly, one or more holes may also be provided in the rear separating rib in order to prevent local dead-water areas in the second trailing-edge coolant passage.

According to an advantageous proposal of the invention, the trailing edge has a normalized height of 100%, beginning at its root-side end at 0% and ending at the blade tip at 100%, wherein the two trailing-edge coolant passages are separated at least substantially from one another by a separating rib which extends mainly in the chordwise direction and which is arranged at a height of between 45% and 75% of the normalized height. In particular in this way, it is possible to achieve a particularly efficient division of the coolant quantity available overall, by way of which homogeneous cooling of the blade airfoil, on the one hand, and further reduced coolant consumption, on the other hand, can be achieved per se. In order for the casting cores required for casting the turbine blade, which casting cores leave behind the two rear trailing-edge coolant passages at a later stage, to be able to be fastened better and for core breakage to be avoided, it is helpful if said casting cores are connected directly to one another via a small number of struts. Although the struts then leave behind openings in the separating rib in the finished turbine blade, which openings eliminate complete separation of the two trailing-edge cooling channels, the two trailing-edge cooling channels are still substantially separated from one another.

In a further refinement of the invention, it is preferably provided that the serpentine coolant passage comprises at least two channel sections, extending in the spanwise direction, and at least two reversal sections, which alternate with one another, wherein the reversal section situated further downstream in the coolant stream is connected in terms of flow directly to the first trailing-edge coolant passage.

Particularly preferable and advantageous is the refinement of the above-described embodiment in which the two channel sections, by means of a displacement body and by means of the two side walls, are, in a cross-sectional view of the blade airfoil, each of substantially C-shaped form with a suction-side channel arm, a pressure-side channel arm and a connecting arm connecting the two channel arms and are arranged in relation to one another in such a way that they almost completely surround the displacement body. This makes it possible to provide a turbine blade which is configured as a multi-wall. As a result of the configuration as a multi-wall, it is firstly possible to produce a blade airfoil which, even in the case of low usage of resources, has relatively small curvature at the leading edge. This small curvature of course strongly promotes the generation of swirl in the first coolant passage. Secondly, as result of the multi-wall configuration, the cooling sections can acquire relatively small throughflow cross sections. During operation, it is then the case that the second coolant stream flows through the channel sections or through the serpentine coolant passage at sufficiently high speed and thus with formation of a sufficiently high heat transfer. This in particular reduces the quantity of required coolant for efficient cooling of the middle region of the blade airfoil between leading edge and trailing-edge region. With the aid of this measure, the consumption can be reduced by a further 40% approximately, whereby the thermal efficiency of the turbine blade can then be brought relatively close to the theoretical maximum.

Here, it proves to be expedient if the displacement body, in a cross-sectional view, reaches around a cavity and is supported via webs against the two side walls.

According to an advantageous refinement, in a turbine rotor blade, for the purpose of compensating for Coriolis forces acting on the second coolant during operation, provision may be made at one, preferably at two, support ribs, which connect the pressure-side wall to the suction-side wall and extend from the root-side end toward the blade tip, of elements, preferably turbulators, on the support rib or on the inner surfaces, delimiting the connecting arms, of the displacement body. This allows a transverse flow of coolant from the suction-side channel arm into the pressure-side channel arm through the connecting arm to be reduced.

According to a further embodiment, the cavity cannot be flowed through by coolant since it has no exit opening for coolant. This prevents unwanted disturbance of the second coolant flow, but makes possible the use of a particularly simple casting device, in the case of which the casting cores used are fastened in a particularly simple and stable manner to further components of the casting device. The turbine blade according to the invention is preferably cast accordingly, wherein an opening which is present in the blade root after the casting of the turbine blade and which is connected directly to the cavity is closed off by a separately produced cover plate. This applies analogously to an opening which is present in the blade root after the casting of the turbine blade and which is connected directly to the first trailing-edge coolant passage. Preferably, such an opening is also closed off in that a separately produced cover plate is fastened to the blade root in a manner completely covering the respective opening.

Expediently, for each cooling path, provision is made of one or more inlets which are connected in terms of flow directly to the first coolant passage or the supply passage or to the serpentine coolant passage or one of the channel sections thereof.

Preferably, the turbine blade has an aspect ratio of a trailing-edge span width to a chord length to be measured at the root-side end that is 3.0 or less, since it has been found that the proposed division of the available coolant into two coolant streams, which are preferably separated from one another, and the simultaneously proposed division of the cooling of the trailing-edge region, in particular for turbine blades of said type, makes possible a considerable saving of the quantity of coolant.

In principle, it is possible for the above-described turbine blade to be used both as a rotor blade attached to a rotor and as a guide vane attached to a static carrier.

Surprisingly, the above-described turbine blade can also be used in a first or second turbine stage of a stationary gas turbine, having, during nominal operation under ISO conditions, a turbine-entry temperature of at least 1300° C. and/or having a compression ratio, occurring during nominal operation under ISO conditions, of 19:1 or greater. Within the context of the present application, so-called aeroderivatives do not fall within the definition of stationary gas turbines. Consequently, the invention is suitable not only for stationary gas turbines whose hot-gas temperatures at the turbine entry are considered to be relatively low under present-day standards.

The above description of advantageous configurations of the inventions contains numerous features which, in the individual dependent claims, are in some cases reproduced combined into a unit. However, said features may expediently also be considered individually and combined into further combinations. In particular, said features can be respectively combined individually and in any suitable combination both with the method according to the invention and the device according to the invention. In this regard, for example, method features, worded substantively, are also to be considered to be properties of the corresponding device unit, and vice versa.

Even where certain terms are used in each case in the singular or in combination with a numeral in the description and/or in the patent claims, it is not intended for the scope of the invention to be restricted, for said expressions, to the singular or to the respective numeral. Furthermore, the words “a” and “an” are to be understood not as numerals but as indefinite articles. Likewise, the numerical terms “first”, “second”, “third”, etc. serve merely for distinguishing features which, in principle, are of a similar nature.

The above-described properties, features and advantages of the invention and the manner in which they are achieved will be discussed in more detail in a comprehensible manner in conjunction with the following description of the exemplary embodiments on the basis of the following figures.

DETAILED DESCRIPTION OF INVENTION

In the figures, all technical features denoted by identical reference signs have the same technical effect.

The invention will be discussed below on the basis of a turbine blade 10 which is in the form of a turbine rotor blade. The invention may however also involve a turbine guide vane.

Figure 1:
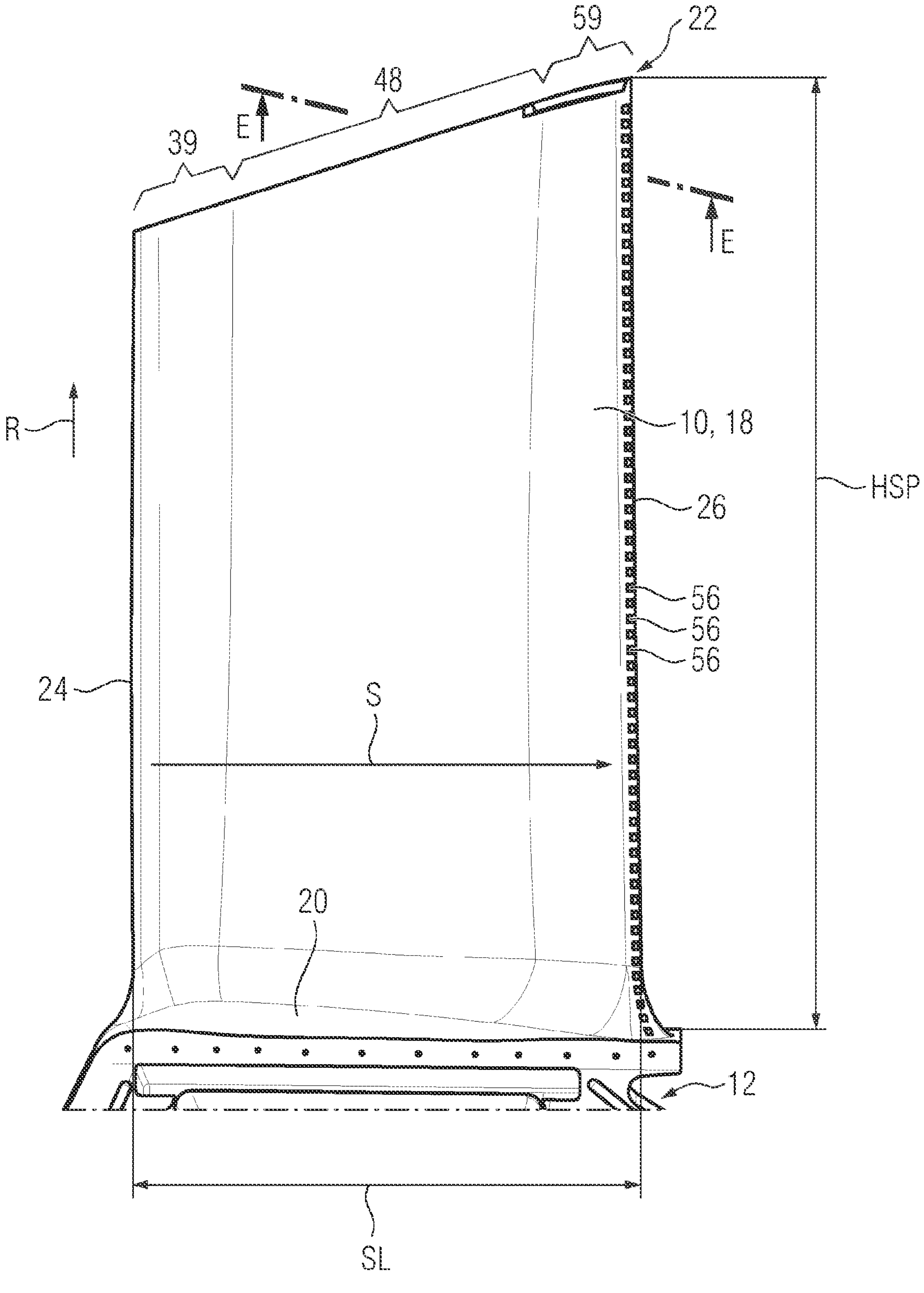
FIG. 1 shows a side view of a turbine rotor blade according to a first exemplary embodiment.

FIG. 1 shows, in a side view, a turbine blade 10 as a first exemplary embodiment of the invention. The turbine blade 10, which is preferably produced in a precision casting process, comprises a blade root 12, which is shown only partially. The blade root 12 may, in a known manner, be of dovetail-shaped or fir-tree-shaped form. Said blade root is adjoined by a platform 13, from which a blade airfoil 18 extends in a spanwise direction R from a root-side end 20 to a blade tip 22. If the turbine rotor blade 10 is installed in a gas turbine which is flowed through axially, the spanwise direction and the radial direction of the gas turbine coincide. In a chordwise direction S, which is oriented transversely to the spanwise direction R, the blade airfoil 18 extends from a leading edge 24 to a trailing edge 26. In the trailing edge 26, exit holes 46, 56 are distributed along the spanwise direction. An aspect ratio HSP/SL of a trailing-edge span width HSP to a chord length SL to be measured at the root-side end is 1.9 according to this exemplary embodiment and preferably lies in the range between 1.5 and 3.

Exit openings 28 open out at a lateral surface of the platform 13 too. The exit holes 46, 56 and the exit openings 28 are connected in terms of flow to an inner cooling system of the turbine rotor blade 10.

Figure 2:
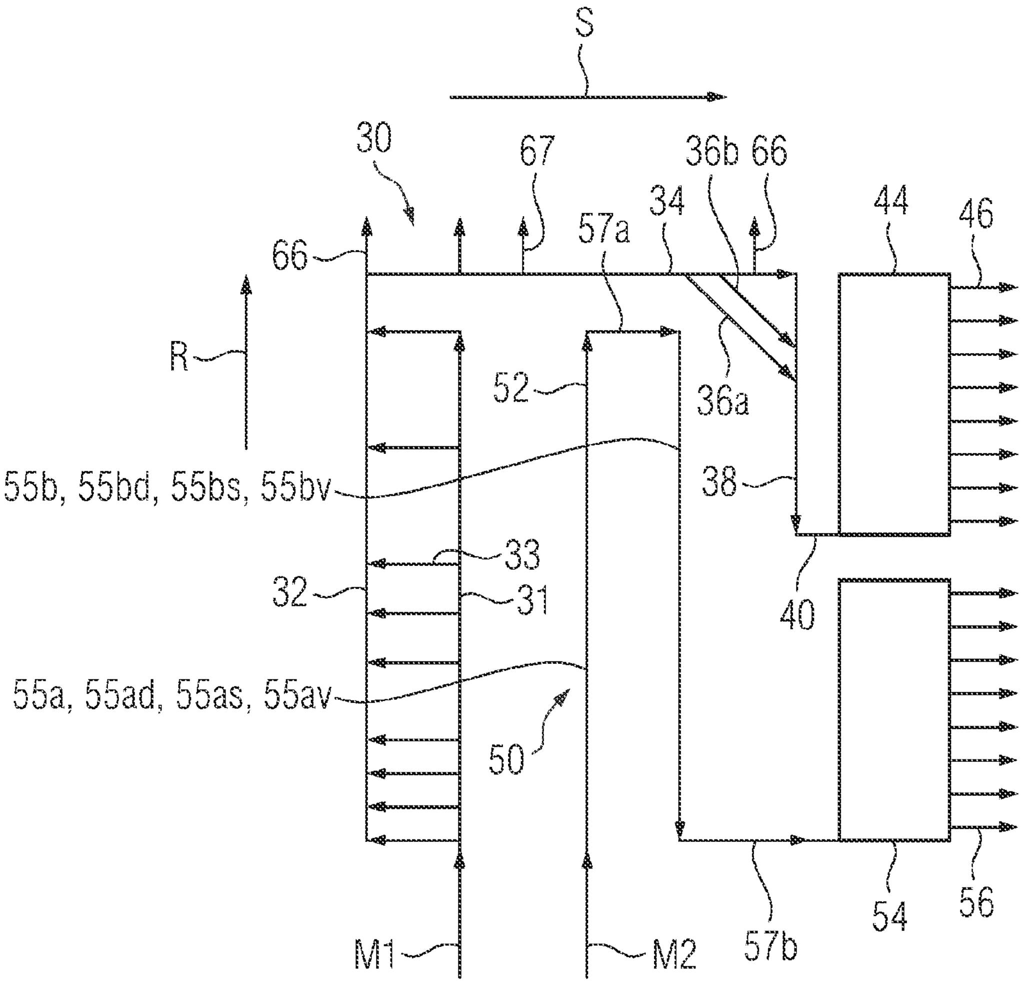
FIG. 2 shows the cooling schemes for the turbine rotor blade as per FIG. 1.

The cooling system of the turbine rotor blade 10 and in particular of the blade airfoil 18 is represented schematically in FIG. 2 by cooling schemes. A first coolant stream M1 and a second coolant stream M2 can be fed separately to the turbine rotor blade 10. The first coolant stream M1 flows through a first cooling path 30, which is made up of multiple coolant passages 31, 32, 33, 34, 36*a*, 36*b*, 38, 40, 44. A supply passage 31 follows downstream of an inlet (not illustrated in FIG. 2) for the coolant stream M1, and is connected in terms of flow to a first coolant passage 32 via a multiplicity of passage openings 33. The first coolant passage 32 serves for cyclone cooling of the leading edge 24 of the blade airfoil 18 and of the directly adjoining leading-edge region 39. In the region of the blade tip 22, the first coolant passage 32 transitions into a second coolant passage 34, which, for the purpose of cooling the blade tip 22, extends from the leading edge 24 in the direction of the trailing edge 26 over a relatively large chord length of the blade tip 22. Third exit holes 67 may be arranged in the blade tip for the purpose of cooling rubbing edges, which are mentioned later. Furthermore, the second coolant passage 34 comprises two cooling-channel arms 36*a*, 36, which begin only in the second half of the second cooling passage 34 and, just like the downstream end of the second coolant passage 34, are connected to a third coolant passage 38. The latter is connected in terms of flow to a second trailing-edge coolant passage 44 via a reversal section 40. The coolant stream M1 flowing through the first cooling path 30 can then exit the turbine rotor blade 10 at the trailing edge 26 thereof via a multiplicity of second exit holes 46. Arranged parallel to the first cooling path 30 and in a manner separated preferably completely in terms of flow therefrom is a second coolant path 50, which, downstream of an inlet (not illustrated in more detail in FIG. 2), has a serpentine coolant passage 52. According to this exemplary embodiment, the serpentine coolant passage 52 comprises, for cooling of a middle region 48 (FIG. 1), two channel sections 55*a*, 55*b* which extend in the spanwise direction and which are connected to one another via a reversal section 57*a* arranged therebetween. A second reversal section 57*b* adjoins the downstream end of the second channel section 55*b*, and connects the second channel section 55*b* to a first trailing-edge coolant passage 54 in terms of flow. The second coolant stream M2 flowing through the second cooling path 50 can then exit the turbine rotor blade 10 at the trailing edge 26 thereof via a multiplicity of first exit holes 46. Both trailing-edge coolant passages 44, 54 serve for cooling a trailing-edge region 59 (FIG. 1).

Figure 3:
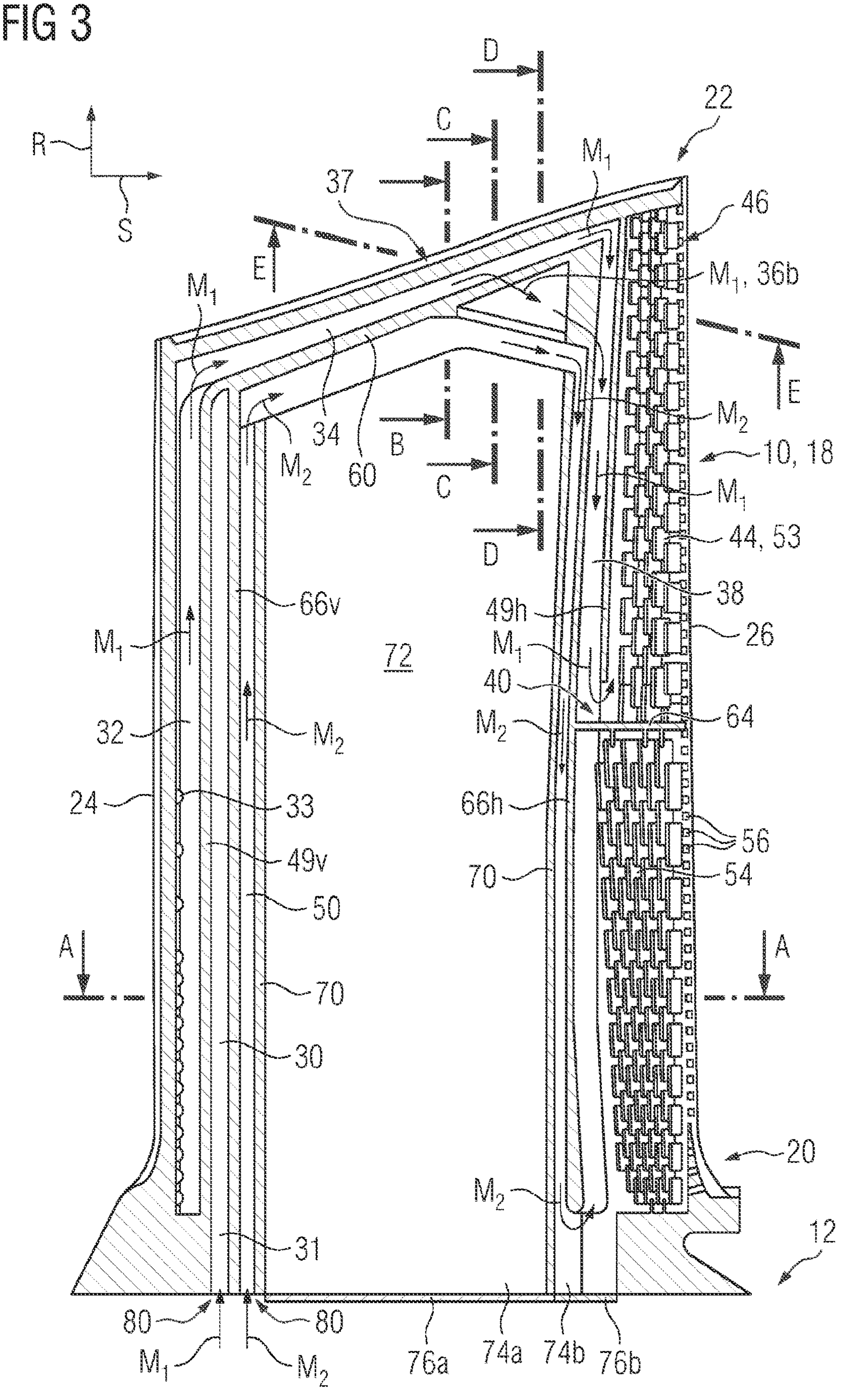
FIG. 3 shows a longitudinal section through the turbine rotor blade according to the first exemplary embodiment.
Figure 4:
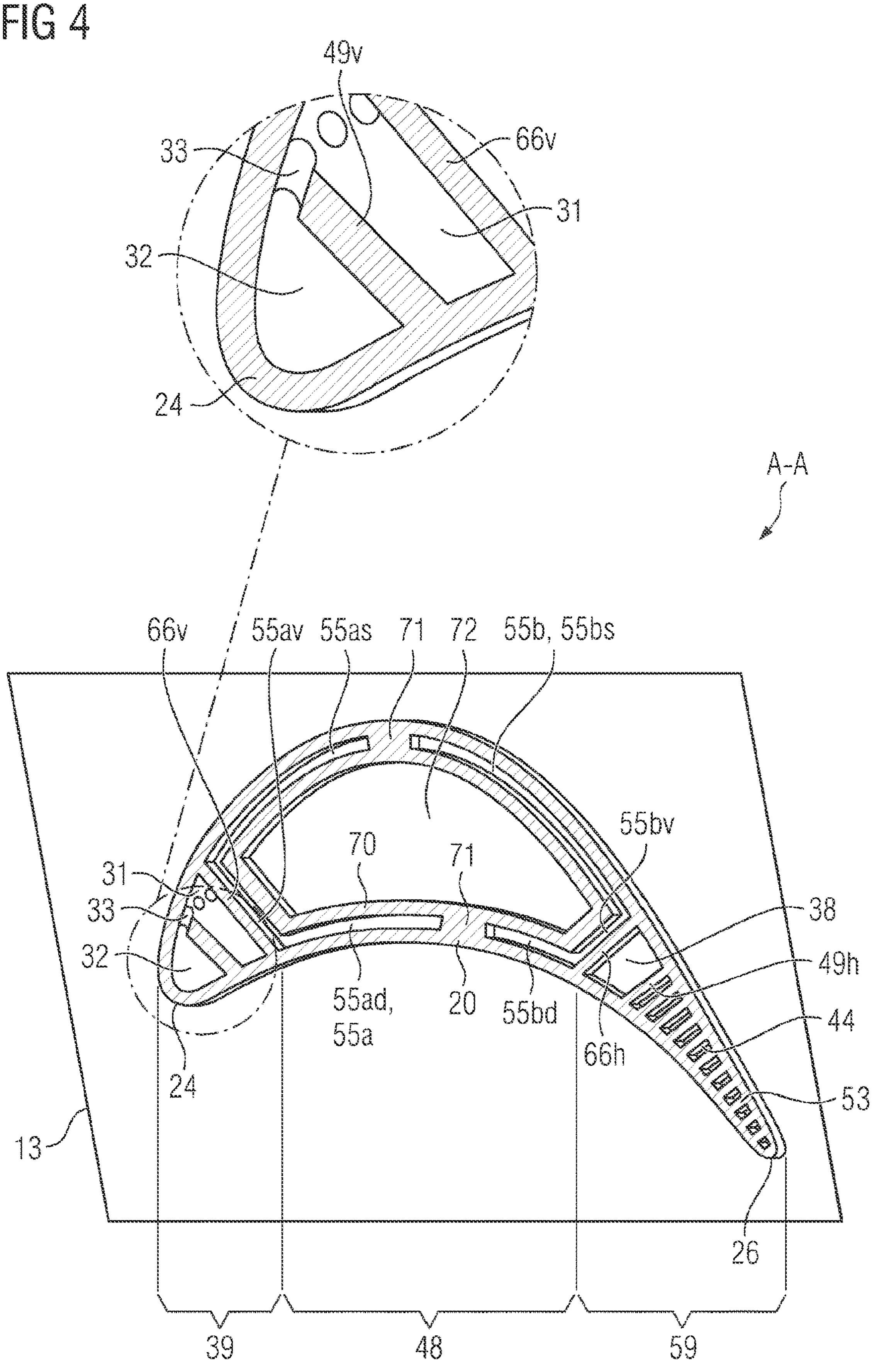
FIG. 4 shows a cross section through the turbine rotor blade as per FIG. 3 along the section line A-A.

FIG. 3 shows, in the form of a longitudinal section, an inner structure of the turbine rotor blade 10 as per FIG. 1, which is formed in a manner corresponding to the cooling schemes in FIG. 2. To this end, the turbine rotor blade 10 comprises a series of differently arranged walls and ribs that separate the individual cooling paths and coolant passages from one another. In the blade root 12, provision is made of two inlets 80 for the two coolant streams M1 and M2 or for the two cooling paths 30, 50. Arranged between the two inlets 80 is a front support rib 66*v*, which connects the side walls 14, 16 to one another and, for a first section, separates the first cooling path 30 from the second cooling path 50. Moreover, a front separating rib 49*v* separates the supply passage 31 from the first coolant passage 32, wherein a multiplicity of passage openings 33 (detail of FIG. 4) are arranged in the front separating rib 49*v*. In FIG. 3, however, of these, merely the mouths of the passage openings are illustrated. As emerges from FIG. 3, a higher density of passage openings 33 is provided in the region close to the platform than in the region close to the tip. The position and the orientation of the passage openings 33 in the front separating rib 49*v* is selected in such a way that a relatively intensely swirled coolant flow can be formed in the first coolant passage 32. A swirled coolant flow is to be understood as meaning one which can be formed in a cyclone-like manner, or analogously to a spiral line or a helix, from the root-side end 20 to the blade tip 22. Consequently, said passage openings are arranged in the front separating rib 49*v* eccentrically and in particular in a manner aligned with the inner walls of the suction-side wall 16 (or pressure-side wall), possible even with an inclination toward the blade tip 22 in order to at least partially compensate for the weakening of the swirl during the flow through the first coolant passage 32.

The outer end of the first coolant passage 32 is adjoined by the second coolant passage 34 for cooling of a base 37 of the blade tip 22, wherein the second coolant passage 34 is separated from the serpentine coolant passage 52 by a separating wall 60. That end of the second coolant passage 34 which is close to the trailing edge is adjoined by the third coolant passage 38, which extends from the blade tip 22 in the direction of the root-side end 22, although only to approximately half the height of the blade airfoil 18, wherein the height of the blade airfoil 18 is to be measured at the trailing edge 26. Said third coolant passage is adjoined by a further reversal section 40, by means of which the first coolant stream M1 can be fed to the second trailing-edge coolant passage 44. The third coolant passage 38 is mostly separated from the second trailing-edge coolant passage 54 by a correspondingly formed rear separating rib 49*h*.

In the second trailing-edge coolant passage 44, pedestals 53 which can flowed around by the coolant M1 are arranged one behind the other in multiple rows. In the exemplary embodiment shown, the pedestals have more of a racetrack-shaped form, and relatively narrow passages, so as to bring about the greatest possible pressure loss. The first cooling path 30 ends in second exit holes 46 which are provided in the trailing edge 26 and through which at least a major part of the coolant stream M1 fed through the associated inlet 80 can be released from the turbine rotor blade 10.

The second cooling path 50 for guiding the second coolant stream M2 and comprises substantially the serpentine coolant passage 52 and the first trailing-edge coolant passage 44. The former can be subdivided into four sections which follow one after the other, of which the first one is referred to as first channel section 55*a*. There follow in an adjoining manner in succession a first reversal section 57*a*, a second channel section 55*b* and a second reversal section 57*b*. The latter connects the serpentine coolant passage 52 to the second trailing-edge coolant passage 54, which, analogously to the first trailing-edge coolant passage 44, is formed with racetrack-shaped pedestals 53 arranged in multiple rows.

The two channel sections 55*a*, 55*b* of the serpentine coolant passage 52 extend along the spanwise direction R over a major part of the blade airfoil 18. The first channel section 55*a* as well as the second channel section 55*b* are, as additionally illustrated in FIG. 4, substantially U-shaped with in each case one channel arm 55*as*, 55*bs* arranged on the suction side, one channel arm 55*ad*, 55*bd* arranged on the pressure side, and one connecting arm 55*av*, 55*bv* connecting the respective channel arms. Accordingly, the first channel section 55*a* is surrounded by the pressure-side side wall 14, by the front support rib 66*v*, by the suction-side side wall 16, and by a displacement body 70 (in cross section in FIG. 4) that is arranged in the interior. The second channel section 55*b* is surrounded by the pressure-side side wall 14, by a rear support rib 66*h*, by the suction-side side wall 16, and by the displacement body 70 arranged in the interior. The displacement body 70 itself reaches around a cavity 72 and is supported via webs 71 against the pressure-side side wall 14 and the suction-side side wall 16. The webs 71 extend approximately over the entire height of the blade airfoil 18 and serve for monolithic fastening of the displacement body 70 in the turbine rotor blade 10, on the one hand, and for separating the two channel sections 55, 57, on the other hand. Referring to FIG. 2, it can be seen that the displacement body 72 is supported, at its radially outer end, at the trailing-edge side. This measure improves the mechanical integrity of the turbine rotor blade 10 and in particular its resistance to vibration.

The two trailing-edge coolant passages 44, 54 are separated from one another at least substantially, if not completely, by a separating rib 64 which extends mainly in the chordwise direction S. According to the exemplary embodiment, the separating rib 64 ends at a height of 55% of a normalized blade-airfoil height of the trailing edge 26. Preferably, the separating rib 64 is arranged at a height of between 45% and 75% of the normalized height.

Figure 5:
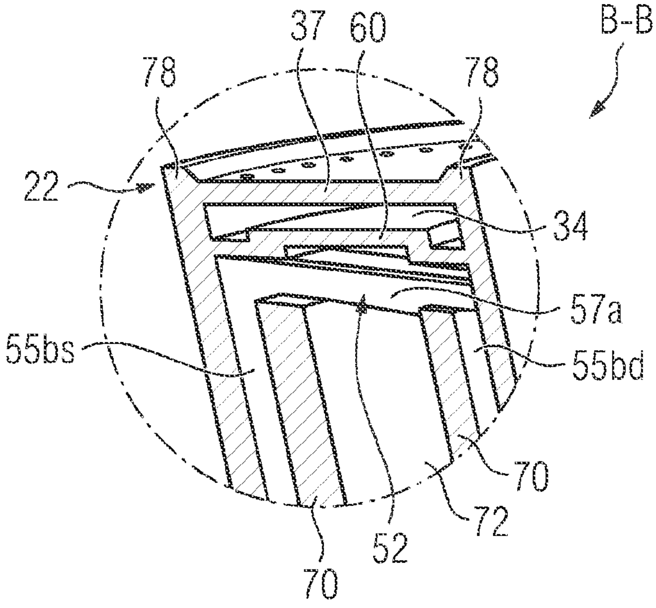
FIGS. 5-7 show longitudinal sections through the turbine rotor blade as per FIG. 3 along the section lines B-B, C-C and D-D, respectively.
Figure 6:
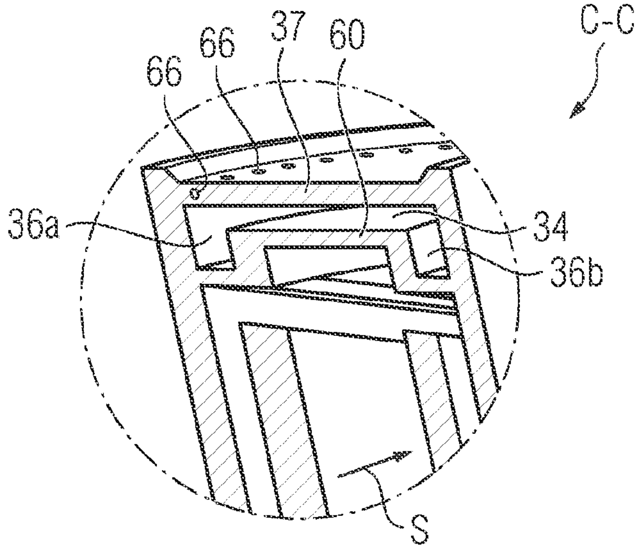
Figure 7:
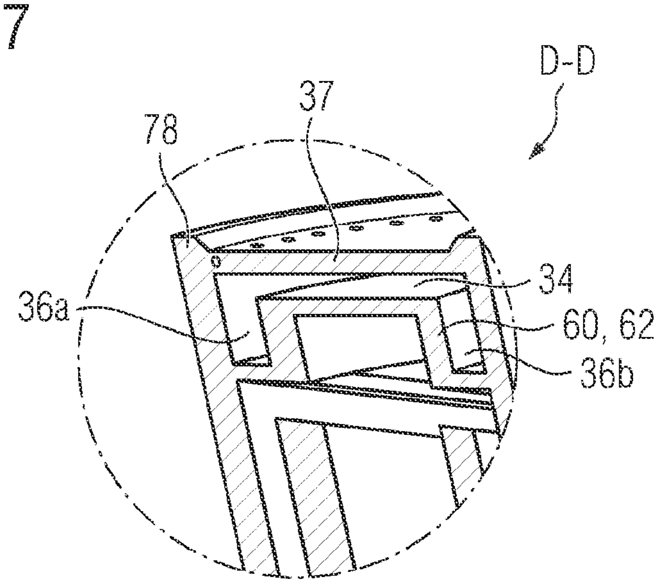

FIGS. 5 to 7 shows sections through the tip of the turbine rotor blade 10 according to the three section lines B-B, C-C and D-D from FIG. 3. Rubbing edges 78 are provided on the outer end of the blade tip 22, both on the suction side and on the pressure side. Moreover, it can be seen that the displacement body 70, at its radially outer end, is not closed off but is open toward the first reversal section 57*a*. Although an inflow of the second coolant stream M2 would thus be possible, since an opening 74*a* at the blade root 12 required for the creation of the cavity 72 or of the displacement body 70 is closed off by a cover plate 76*a* (FIG. 1) attached after the casting, the cavity 72 lacks exit openings. Therefore, said cavity cannot be flowed through, but rather is in the form of a dead-water space. Consequently, it is expedient for the inner configuration thereof, possibly still during the design phase, to be varied by means of the provision of further structures, such as ribs, struts or the like, if modal adaptation is required. The particular advantage would be that the natural frequency of the turbine blade alone would be adapted, without other properties, such as aerodynamics or heat exchange, being influenced.

FIGS. 5 to 7 furthermore show how, with progressively closer proximity to the trailing edge 26, the separating wall 60 forms a displacement wedge 62 which narrows to a point and which, in conjunction with the inner surfaces of the two side walls 14, 16, laterally delimits each of the two cooling-channel arms 36*a* and 36*b*. With the aid of the displacement wedge 62 that narrows to a point, the truncation of the displacement body 70 can be compensated such that guidance of the coolant stream M2 close to the side walls in the truncated region, and thus sufficient cooling thereof, is still efficiently possible. If the truncation of the displacement body is not absolutely necessary, the size of the displacement wedge can be reduced. Possibly, it can even be dispensed with completely.

Figure 8:
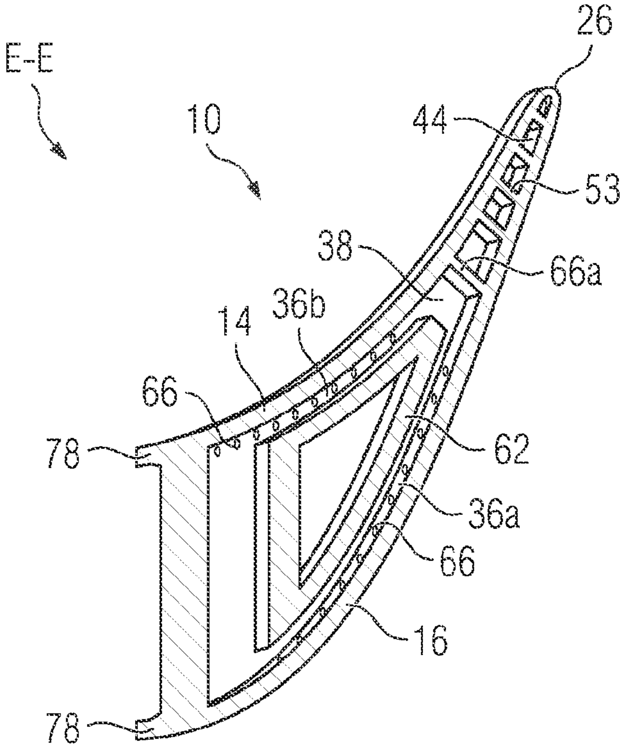
FIG. 8 shows a cross section through the turbine rotor blade as per FIG. 1 along the section line E-E.

FIG. 8 shows, in a view directed toward the blade tip 22, that is to say toward the outside, a cross section of the downstream half of the blade tip 22 according to section line E-E from FIG. 3.

According to an exemplary embodiment that is not shown in any further detail, instead of or in addition to the supply passage 31, provision may be made of a blade-root-side channel section which is able to provide an extension of the first coolant passage 32 as far as the bottom side of the blade root 12. In said blade-root-side channel section, provision may be made of correspondingly suitable swirl generators, for example spiral ribs, which swirl the coolant stream M1 in a cyclone-like manner during the flow through the blade-root-side channel section. In this case, the first coolant passage 32 would be separated by the front support rib 66*v* from the connecting channel 55*av* such that passage openings 33 arranged in the front support rib 66*v* could promote replenishment or boosting of the swirl momentum. In this respect, it may possibly even be expedient for the two coolant streams M1 and M2 to be guided through the turbine blade 10 not entirely separated from one another but so as to permit an exchange to a very small extent, in that, at a very small number of locations, individual holes with preferably small diameters connect to one another the two cooling paths, which are otherwise separated in terms of flow.

Figure 9:
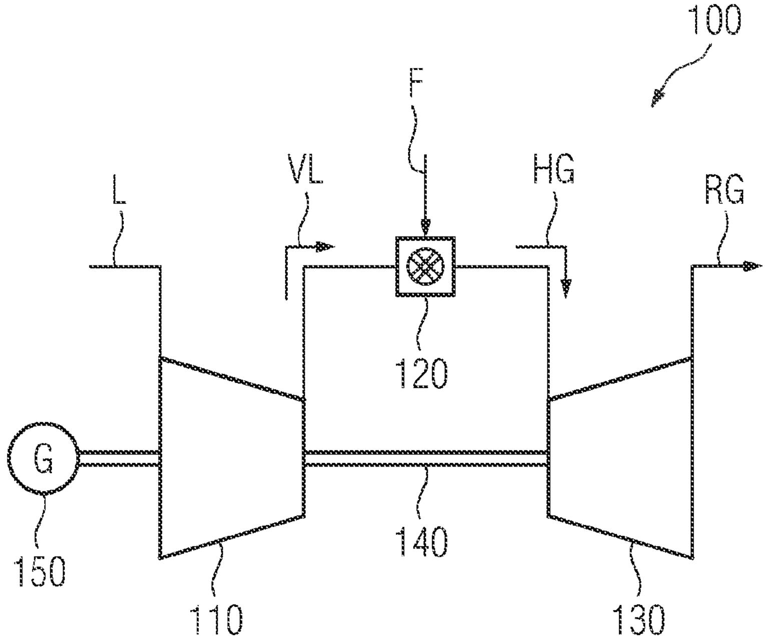
FIG. 9 shows a stationary gas turbine in a schematic illustration.

FIG. 9 shows, merely schematically, a gas turbine 100 with a compressor 110, a combustion chamber 120 and a turbine unit 130. According to this embodiment, a generator 150 for generating electricity is coupled to a rotor 140. The compressor 110 is designed in such a way that, during operation under ISO standard conditions, it can produce a pressure ratio of compressed ambient air VL to sucked-in ambient air L of 19:1 or greater. The compressed air VL is then mixed with a fuel F, and combusted to form a hot gas HG, in the combustion chamber 120. Combustion chamber 120 and turbine unit 130 are designed in such a way that the hot gas HG flowing at the exit of the combustion chamber 120 and at the entry of the turbine unit 130 has a temperature of at least 1300° C. under ISO standard conditions, wherein the rotor blades and guide vanes of the first turbine stage or the second turbine stage are designed in the manner described herein. The hot gas HG, which is expanded in the turbine unit 130, exits the latter as flue gas RG.

Altogether, the invention proposes a turbine blade 10 having a blade root 12 and having a blade airfoil 18 that extends along a spanwise direction R from a root-side end 20 to a blade tip 22 and along a chordwise direction S, which is oriented transversely to the spanwise direction R, from a leading edge 24 to a trailing edge 26, wherein, in the interior of the blade airfoil 18, a first cooling path 30 for a first coolant stream M1 and a second cooling path 50 for a second coolant stream M2 are formed, wherein the first cooling path 30 comprises a first coolant passage 32, which is configured for cyclone cooling of the leading edge 24, and a second coolant passage 34, which adjoins the first coolant passage 32 and extends below the blade tip 22 from the leading edge 24 in the direction of the trailing edge 26, wherein the second cooling path 50 comprises a serpentine coolant passage 52 for cooling of a middle region 48 of the blade airfoil 18, which middle region is arranged behind the leading-edge region 39 in the chordwise direction, and a first trailing-edge coolant passage 54 for at least partial cooling of a trailing-edge region 59 of the blade airfoil 18, which trailing-edge region is arranged behind the middle region 48 in the chordwise direction and extends as far as the trailing edge, wherein the first trailing-edge coolant passage 54 is connected in terms of flow to a multiplicity of first exit holes 56 arranged in the trailing edge 26. In order to provide a turbine blade with a further reduced coolant consumption, it is proposed that the first coolant passage 32 and/or the serpentine coolant passage 52 are/is configured for locally closed cooling and the first cooling path 30 comprises a third coolant passage 38, which adjoins the second coolant passage 34 and extends mainly radially inwardly, and a second trailing-edge coolant passage 44, which adjoins the third coolant passage 38 and is configured for cooling of a blade-tip-side region of the trailing-edge region 59 and is connected in terms of flow to a multiplicity of second exit holes 46 arranged in the trailing edge 26.

The invention claimed is:

1. A turbine blade for a gas turbine which is flowed through axially for a high-pressure turbine stage thereof, comprising:

a blade root and a blade airfoil comprising a pressure-side side wall and a suction-side side wall, wherein the pressure-side side wall and the suction-side side wall extend along a spanwise direction from a root-side end to a blade tip and along a chordwise direction, which is oriented transversely to the spanwise direction, from a leading edge to a trailing edge, wherein, in an interior of the blade airfoil, a first cooling path for a first coolant stream and a second cooling path, substantially separated from the first cooling path, for a second coolant stream are formed, wherein the first cooling path comprises a first coolant passage, which is configured for cyclone cooling of the leading edge, and a second coolant passage, which adjoins the first coolant passage and extends below the blade tip from the leading edge in the direction of the trailing edge, wherein the second cooling path comprises a serpentine coolant passage for cooling of a middle region of the blade airfoil, which middle region is arranged behind a leading-edge region in the chordwise direction, and a first trailing-edge coolant passage for at least partial cooling of a trailing-edge region of the blade airfoil, which trailing-edge region is arranged behind the middle region in the chordwise direction and extends as far as the trailing edge, wherein the first trailing-edge coolant passage is connected in terms of flow to a multiplicity of first exit holes arranged in the trailing edge, wherein the first coolant passage and/or the serpentine coolant passage are/is free of exit holes, and wherein the first cooling path comprises a third coolant passage, which adjoins the second coolant passage and extends mainly radially inwardly, and a second trailing-edge coolant passage, which adjoins the third coolant passage and is configured for cooling of a blade-tip-side region of the trailing-edge region and is connected in terms of flow to a multiplicity of second exit holes arranged in the trailing edge;

wherein the serpentine coolant passage comprises at least two channel sections, extending in the spanwise direction, and at least two reversal sections, wherein the reversal section situated further downstream in the second coolant stream is connected in terms of flow directly to the first trailing-edge coolant passage;

wherein the at least two channel sections, by a displacement body and by the pressure-side side wall and the suction-side side wall, are, in a cross-sectional view of the blade airfoil, each of substantially C-shaped form with a suction-side channel arm, a pressure-side channel arm and a connecting arm connecting the suction-side channel arm and the pressure-side channel arm and are arranged in relation to one another to surround the displacement body.

2. The turbine blade as claimed in claim 1, wherein one or more third exit holes for coolant are arranged in the blade tip and are connected in terms of flow to the second coolant passage.

3. The turbine blade as claimed in claim 1, wherein the first cooling path comprises a supply passage for the first coolant passage, which, in a manner arranged directly adjacent to the first coolant passage and extending at least over a major part of a span width of the blade airfoil, is connected in terms of flow to the first coolant passage via a multiplicity of passage openings, wherein the multiplicity of passage openings are oriented for imparting swirl to the coolant flowing in the first coolant passage.

4. The turbine blade as claimed in claim 3,
wherein a density, ascertainable in the spanwise direction, of the multiplicity of passage openings is greatest at the root-side end.

5. The turbine blade as claimed in claim 3,
wherein a density, ascertainable in the spanwise direction, of the multiplicity of passage openings is greatest at the root-side end, and decreases in a stepped manner or continuously toward the blade tip.

6. The turbine blade as claimed in claim 1,
wherein a multiplicity of pedestals arranged in a pattern is provided in each trailing-edge coolant passage.

7. The turbine blade as claimed in claim 1,
wherein provision is made of two cooling-channel arms, which widen the second coolant passage and, with increasing extent in the chordwise direction, expand radially inward and open out in the third coolant passage.

8. The turbine blade as claimed in claim 7,
wherein a separating wall is arranged between the second coolant passage and the serpentine coolant passage and connects the pressure-side side wall and the suction-side side wall to one another and extends in the chordwise direction, wherein, with progressively closer proximity to the trailing edge, the separating wall forms a displacement wedge which, in conjunction with the inner surfaces of the pressure-side side wall and the suction-side side wall, laterally delimits the two cooling-channel arms.

9. The turbine blade as claimed in claim 7,
wherein a separating wall is arranged between the second coolant passage and the serpentine coolant passage and connects the pressure-side side wall and the suction-side side wall to one another and extends in the chordwise direction, wherein, with progressively closer proximity to the trailing edge, the separating wall forms a displacement wedge which narrows to a point and which, in conjunction with the inner surfaces of the pressure-side side wall and the suction-side side wall, laterally delimits the two cooling-channel arms.

10. The turbine blade as claimed in claim 1,
wherein a rear separating rib is provided between the third coolant passage and the second trailing-edge coolant passage and extends in the spanwise direction.

11. The turbine blade as claimed in claim 1,
wherein the trailing edge has a normalized height of 100%, beginning at its root-side end at 0% and ending at the blade tip at 100%, and
wherein the first trailing-edge coolant passage and the second trailing-edge coolant passage are separated from one another by a separating rib which extends mainly in the chordwise direction and which is arranged at a height of between 45% and 75% of the normalized height.

12. The turbine blade as claimed in claim 1,
wherein the displacement body, in the cross-sectional view, reaches around a cavity and is supported via webs against the pressure-side side wall and the suction-side side wall.

13. The turbine blade as claimed in claim 12,
wherein the cavity cannot be flowed through by coolant and has no exit opening for coolant.

14. The turbine blade as claimed in claim 12,
wherein the turbine blade is cast, and wherein an opening which is present in the blade root after the casting of the turbine blade and which is connected directly to the cavity is closed off by a separately produced cover plate.

15. The turbine blade as claimed in claim 14,
wherein a second opening which is present in the blade root after the casting of the turbine blade and which is connected directly to the first trailing-edge coolant passage is closed off by a second separately produced cover plate.

16. The turbine blade as claimed in claim 1,
wherein the serpentine coolant passage is delimited by two support ribs, which connect the pressure-side side wall to the suction-side side wall and extend from the root-side end toward the blade tip and at which provision is made, on the two support ribs or on inner surfaces of the pressure-side side wall and the suction-side side wall, delimiting the connecting arms, of the displacement body, of turbulators, which reduce a transverse flow of coolant from the suction-side channel arm into the pressure-side channel arm through the connecting arm.

17. The turbine blade as claimed in claim 1,
wherein the turbine blade is cast.

18. The turbine blade as claimed in claim 1,
wherein, for each cooling path, provision is made of one or more inlets which are connected in terms of flow directly to the first coolant passage or a supply passage or to the serpentine coolant passage or to the at least two channel sections.

19. The turbine blade as claimed in claim 1, comprising:
a blade-airfoil aspect ratio HSP/SL of a trailing-edge span width to a chord length to be measured at the root-side end that is 3.0 or less.

20. A first or second turbine stage of a stationary gas turbine, comprising:
a turbine blade as claimed in claim 1, and
a turbine-entry temperature, occurring during nominal operation under ISO conditions, of at least 1300° C. and/or having a compressor pressure ratio, occurring during nominal operation under ISO conditions, of 19:1 or greater.

21. A turbine blade for a gas turbine which is flowed through axially for a high-pressure turbine stage thereof, comprising:
a blade root and a blade airfoil comprising a pressure-side side wall and a suction-side side wall, wherein the pressure-side side wall and the suction-side side wall extend along a spanwise direction from a root-side end to a blade tip and along a chordwise direction, which is oriented transversely to the spanwise direction, from a leading edge to a trailing edge,
wherein, in an interior of the blade airfoil, a first cooling path for a first coolant stream and a second cooling path, substantially separated from the first cooling path, for a second coolant stream are formed,
wherein the first cooling path comprises
a first coolant passage, which is configured for cyclone cooling of the leading edge, and
a second coolant passage, which adjoins the first coolant passage and extends below the blade tip from the leading edge in the direction of the trailing edge, wherein the second cooling path comprises a serpentine coolant passage for cooling of a middle region of the blade airfoil, which middle region is arranged behind a leading-edge region in the chordwise direction, and a first trailing-edge coolant passage for at least partial cooling of a trailing-edge region of the blade airfoil, which trailing-edge region is arranged behind the middle region in the chordwise direction and extends as far as the trailing edge, wherein the first trailing-edge coolant passage is connected in terms of flow to a multiplicity of first exit holes arranged in the trailing edge, wherein the first coolant passage and/or the serpentine coolant passage are/is free of exit holes, and wherein the first cooling path comprises a third coolant passage, which adjoins the second coolant passage and extends mainly radially inwardly, and a second trailing-edge coolant passage, which adjoins the third coolant passage and is configured for cooling of a blade-tip-side region of the trailing-edge region and is connected in terms of flow to a multiplicity of second exit holes arranged in the trailing edge;

wherein provision is made of two cooling-channel arms, which widen the second coolant passage and, with increasing extent in the chordwise direction, expand radially inward and open out in the third coolant passage.

22. The turbine blade as claimed in claim 21, wherein a separating wall is arranged between the second coolant passage and the serpentine coolant passage and connects the pressure-side side wall and the suction-side side wall to one another and extends in the chordwise direction, wherein, with progressively closer proximity to the trailing edge, the separating wall forms a displacement wedge which, in conjunction with the inner surfaces of the pressure-side side wall and the suction-side side wall, laterally delimits the two cooling-channel arms.

* * * * *